UNITED STATES PATENT OFFICE.

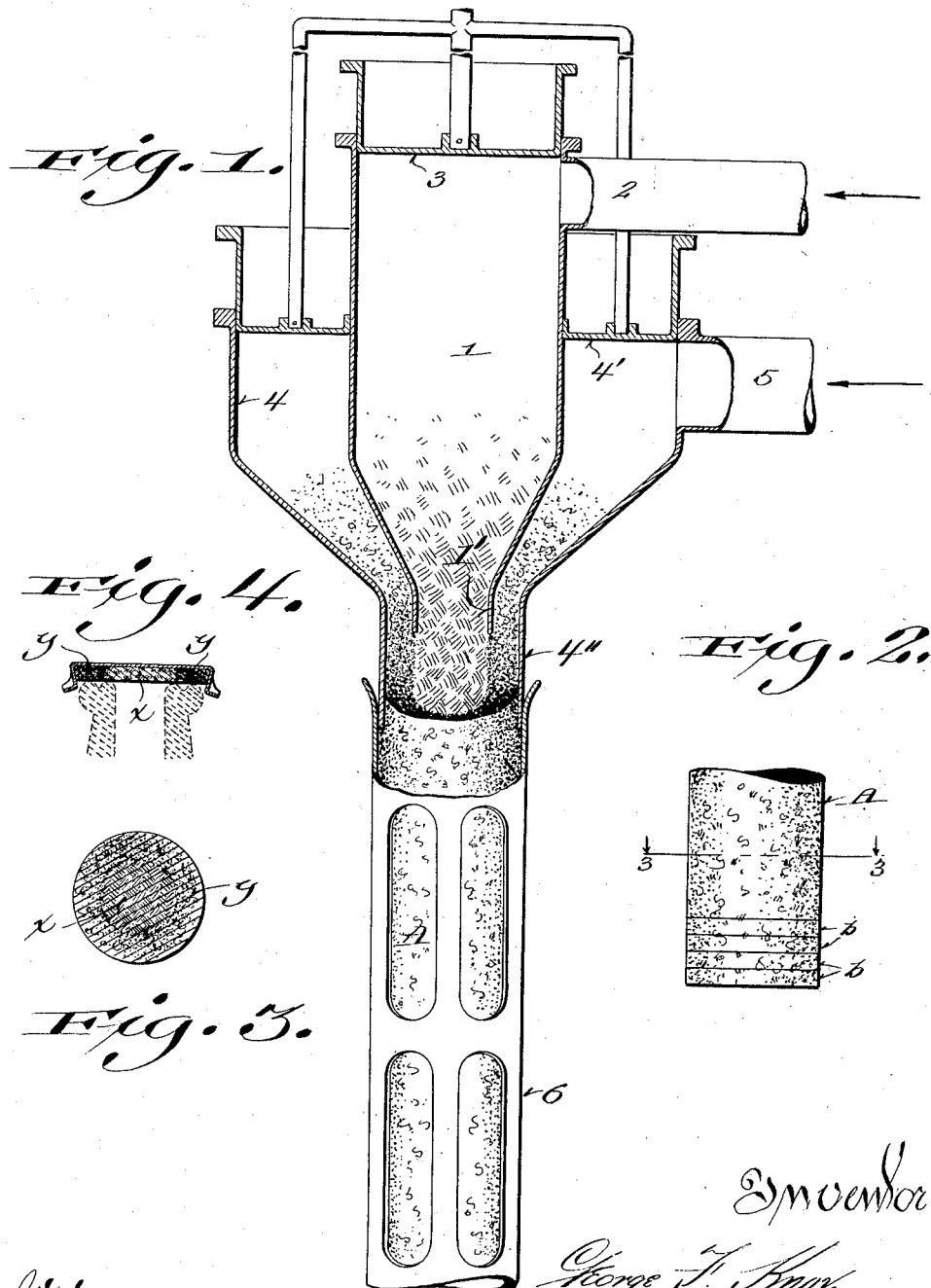

GEORGE F. KNOX, OF LOUISVILLE, KENTUCKY, ASSIGNOR TO KNOX PATENTS COMPANY, OF LOUISVILLE, KENTUCKY.

METHOD OF MANUFACTURING COMPOSITE SEALING-DISKS FOR VESSEL-CAPS.

1,184,354.  Specification of Letters Patent.  Patented May 23, 1916.

Application filed September 8, 1915. Serial No. 49,651.

*To all whom it may concern:*

Be it known that I, GEORGE F. KNOX, a subject of the King of England, and resident of Louisville, in the county of Jefferson and State of Kentucky, have invented certain new and useful Improvements in Methods of Manufacturing Composite Sealing-Disks for Vessel-Caps; and I do hereby declare that the following is a full, clear, and exact description thereof.

The object of my invention is to provide a simple, economical and effective method for manufacturing composite disks to be used in connection with metallic crown caps for sealing liquid containers.

With the above object in view the invention consists in the various progressive steps for forming a column from bulk materials of different densities, whereby the core of the column and its jacket composed of the different materials is molded, the column being dried and thereafter severed transversely into disks of predetermined thickness, which disk surfaces present an outer ring of one material and an inner core of other material particularly adapted to form a seat upon the high surfaces of a grooved face vessel mouth such, for example, as disclosed in a patent issued to me February 23, 1915, No. 1129578.

Heretofore it has been the practice to employ a disk for crown cap sealing purposes composed of granulated cork, the same being molded into a homogeneous mass, the binder for which comprises some adhesive material. These composition cork disks are preferable owing to the fact that their close grain renders a more perfect seal and also the cost of manufacture renders them cheaper than a natural cork disk of the same dimensions, which natural cork disks develop crevices whereby an imperfect seal will result. However, in utilizing the composition disks mentioned, it has been found that the moisture from the contents of the vessel frequently permeates and thereby disintegrates the disk and thus contaminates the product. Hence my present method of manufacturing a disk will overcome this objectionable feature and consists essentially in forming the central portion of the disk which is subjected to the influence of the liquid from some material that is impervious to moisture, while the outer portion of the disk which forms the seating face may be composed of granulated cork or other analogous material.

In the drawings Figure 1 represents a diagrammatic sectional elevation of a column-forming mechanism employed in the first step of my method; Fig. 2, an elevation of a portion of a column molded by the forming mechanism with one end thereof shown cut transversely into a series of disks; Fig. 3, a cross-section of the column showing its differential core and jacket, and Fig. 4, a sectional view of a crown cap equipped with a disk made in accordance with my method.

Referring by characters to the drawings, 1 represents a core cylinder provided with a supply pipe 2, whereby pulpy material is supplied. The bottom of the core cylinder is contracted to form a choke-bored tubular mouth 1' and the upper portion of the cylinder has fitted therein a piston head 3, which piston head may be actuated hydraulically or by other suitable power. Surrounding the core cylinder 1 is a jacket cylinder 4, which jacket cylinder is also provided with a supply pipe 5 for some pulpy or granular material such as granulated cork that may contain an adhesive vehicle as a binder, whereby the material is rendered soft or pulpy. It is understood that the material fed to the inner core cylinder also contains a percentage of moisture and an adhesive vehicle. Thus each material is plastic and can be readily formed into any desired shape.

The jacket cylinder 4 is equipped with a ring-like piston-head 4', which head may, as shown, be connected to the piston-head 3 or may be independently actuated by a suitable source of power. The lower end of the jacket cylinder is contracted to form a tubular discharge mouth 4", which mouth extends slightly below the mouth 1' of the core cylinder and is arranged concentrically therewith. For example, the plastic material fed to the jacket cylinder is preferably composed of granulated cork as the main vehicle or body and the inner core material may be composed of paper or other fibrous pulp. Hence to form a column the piston-heads are forced downwardly whereby the separated materials will be simultaneously discharged through the mouths 4" and 1', whereby a plastic column is formed with a core of fibrous material and a jacket of the cork material. This column so formed may be discharged into a receiving casing 6, which casing in this instance is shown detachably fitted to the mouth 4″ of the jacket cylinder. When a sufficient length of column has been discharged the same is separated from the forming apparatus and subjected to a drying operation. It is understood that it is preferable to subject the column after it is formed to some waterproofing agent such as paraffin, but it is obvious that in some instances the materials of different densities may contain a certain percentage of paraffin or other waterproofing ingredient. Thus it will be seen that a column A of any desired length can be produced, from which, as shown in Fig. 2, transverse sections $b$ may be cut off to produce disks of a predetermined thickness having cores of tough fibrous material $x$ which will not slough off or disintegrate when subjected to moisture while the outer jacket portion or ring $y$ of the disk is of cork material having maximum pliability or elasticity whereby a perfect seal can be effected when the cork is caused to engage the mouth of a bottle or other liquid container. The core in this instance will project over the bottle lip in such manner that the cork portion is entirely cut off from the liquid and this result is especially noticeable wherein a grooved mouth bottle is used, such as described in my patent referred to.

The disk in being fitted to a grooved mouth bottle, will effect a seat in connection with the inner high point of the groove and its core $x$ and a second seat in connection with the outer disk ring $y$ and the outer head of the vessel mouth, as shown in Fig. 4.

It will also be understood that, owing to the method of forming the disks of material of different densities, the said materials at their point of union will so interlock as to form a homogeneous mass, whereby there is no tendency of one of the substances becoming detached from the other substance.

I claim:

1. A method of manufacturing sealing disks for vessel caps consisting of forcing pulpy materials of different consistencies through associated forms to cause said materials to be molded into a column having a core of one material and an outer jacket of the other material, drying the molded column and thereafter cutting the same transversely into finished disks of predetermined thicknesses.

2. A method of manufacturing sealing disks for vessel caps consisting of forcing plastic material of different consistencies through associated forms to cause the material to be molded into a column having a core of one material and a jacket of the other material, subjecting the column to a waterproofing product, drying said column and thereafter cutting the same into disks of predetermined thickness.

3. A method of manufacturing sealing disks for vessel caps consisting of forcing a fibrous pulpy material through a core form and simultaneously forcing a pulpy cork material through a concentric jacket form, whereby the said materials are caused to be molded into a homogeneous column, and cutting the column transversely into disks.

In testimony that I claim the foregoing I have hereunto set my hand at Milwaukee, in the county of Milwaukee and State of Wisconsin, in the presence of two witnesses.

GEORGE F. KNOX.

Witnesses:
 GEO. W. YOUNG,
 M. E. DOWNEY.